(12) United States Patent
Figart

(10) Patent No.: US 12,065,069 B1
(45) Date of Patent: Aug. 20, 2024

(54) WHEEL CHOCK AND METHOD OF USE

(71) Applicant: Bradlee Figart, Hickory Creek, TX (US)

(72) Inventor: Bradlee Figart, Hickory Creek, TX (US)

( * ) Notice: Subject to any disclaimer, the term of this patent is extended or adjusted under 35 U.S.C. 154(b) by 36 days.

(21) Appl. No.: 17/671,243

(22) Filed: Feb. 14, 2022

(51) Int. Cl.
*B60P 3/077* (2006.01)

(52) U.S. Cl.
CPC ................................. *B60P 3/077* (2013.01)

(58) Field of Classification Search
None
See application file for complete search history.

(56) References Cited

U.S. PATENT DOCUMENTS

| | | | | |
|---|---|---|---|---|
| 4,144,951 A | * | 3/1979 | Rea | B60T 3/00 188/32 |
| 4,842,460 A | * | 6/1989 | Schlesch | B61D 45/006 410/121 |
| 2005/0077121 A1 | * | 4/2005 | Chrisco | B60T 3/00 188/32 |
| 2019/0299943 A1 | * | 10/2019 | Gregory | B60T 7/20 |
| 2021/0046908 A1 | * | 2/2021 | Omran | B62B 5/049 |

FOREIGN PATENT DOCUMENTS

DE  102007028764 A1 * 4/2009 .............. B60P 3/077

* cited by examiner

*Primary Examiner* — Melanie Torres Williams
(74) *Attorney, Agent, or Firm* — Avek IP, LLC

(57) ABSTRACT

A wheel chock utilizing a magnet that enables quick employment while providing for easy and efficient transport and storage is disclosed. The wheel chock comprises a generally triangular shaped body having a top portion, a flat bottom portion, opposing sides, and a rear portion; and a magnet securely coupled to the rear portion via a fastening mechanism. The magnet is configured to exert a vertical magnetic force of approximately 100 pounds.

10 Claims, 6 Drawing Sheets

WHEEL CHOCK AND METHOD OF USE

BACKGROUND

1. Field of the Invention

The present invention relates generally to wheel chocks, and more specifically to a wheel chock utilizing a magnet that enables quick employment while providing for easy and efficient transport and storage.

2. Description of Related Art

Wheel chocks are well known in the art and are effective means to prevent accidental movement of a vehicle's wheels. Examples of vehicles that benefit from the user of wheel chocks include trucks, trailers, campers, cars, recreational vehicles, and the like. Typically, one or more wheel chocks are employed to maintain a stable position against external forces (e.g., gravity) and environmental conditions (e.g., wind, snow, ice, etc.). In this regard, these chocks are usually transported with the vehicle for easy access.

One of the problems associated with conventional wheel chocks is their limited efficiency. For example, conventional wheel chocks have body configurations that are space consuming, making it difficult to store within a vehicle during transport. In addition, because a plurality of wheel chocks is typically used for a vehicle's wheels, the user must inconveniently find additional space within the vehicle to transport and store the wheel chocks.

Accordingly, it is an object of the present invention to provide an improved wheel chock that enables quick employment while providing for easy and efficient transport and storage.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1A:
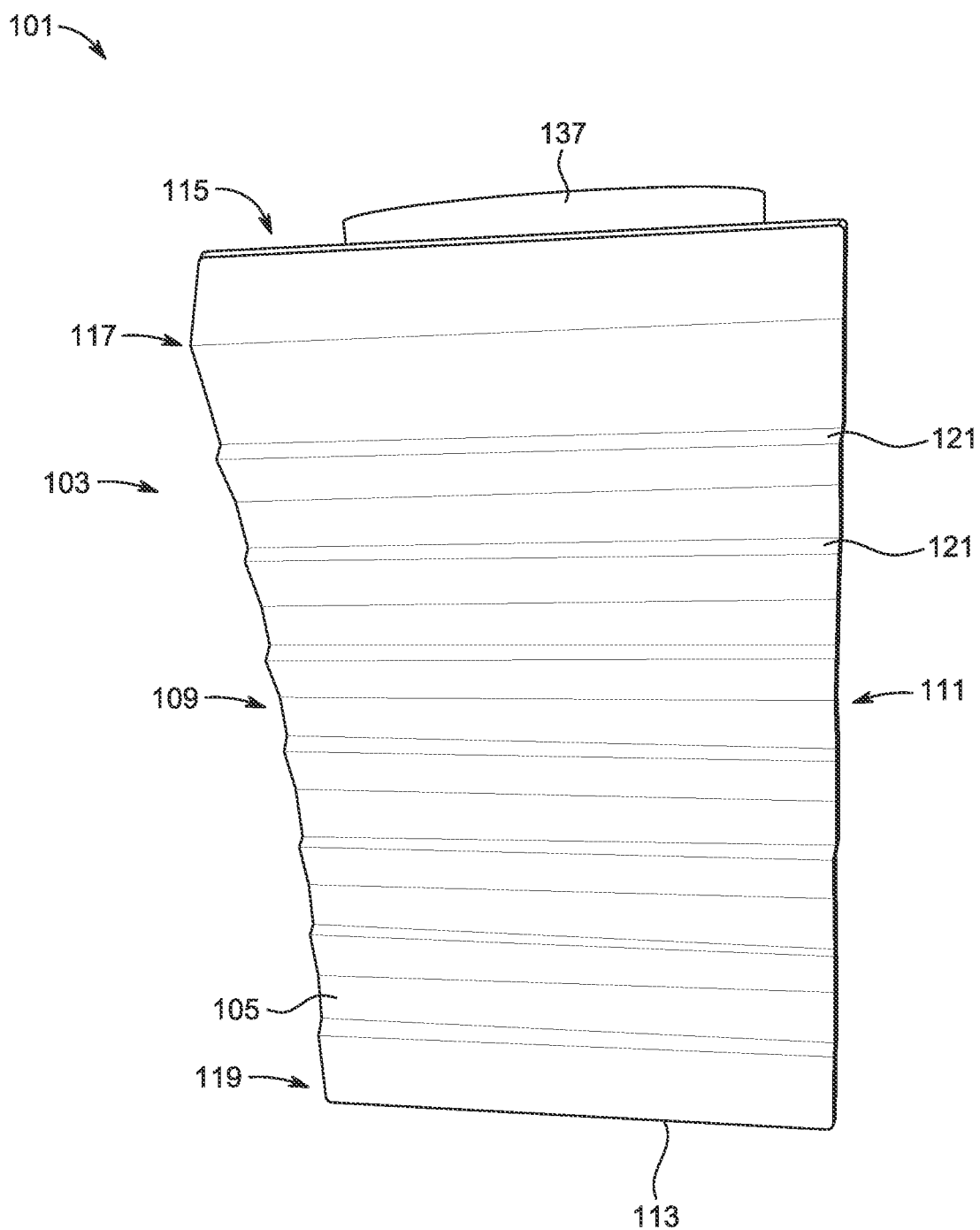
FIG. 1A is a top perspective view of a wheel chock in accordance with a preferred embodiment of the present invention.
Figure 1B:
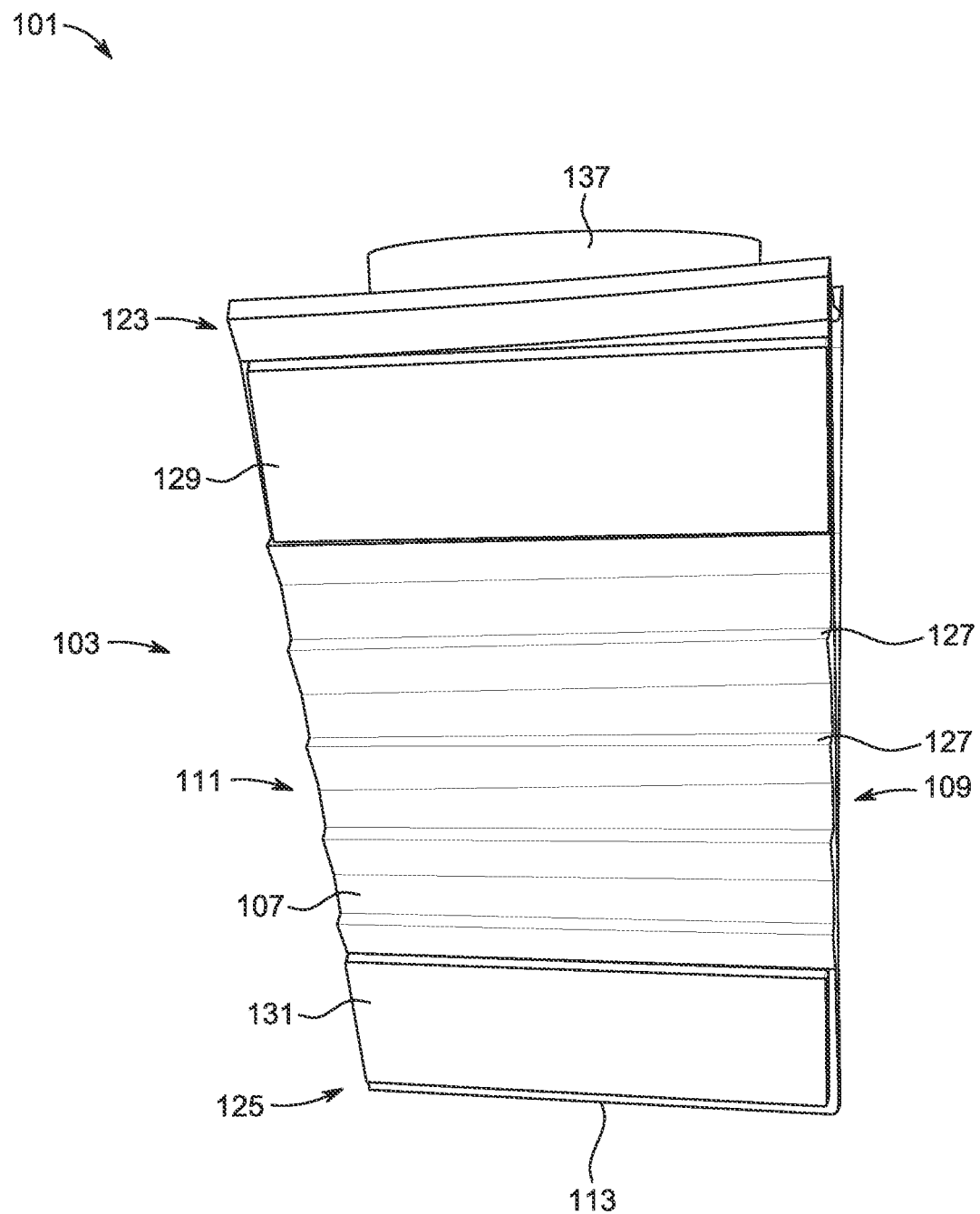
FIG. 1B is a bottom perspective view of the wheel chock of FIG. 1A.
Figure 1C:
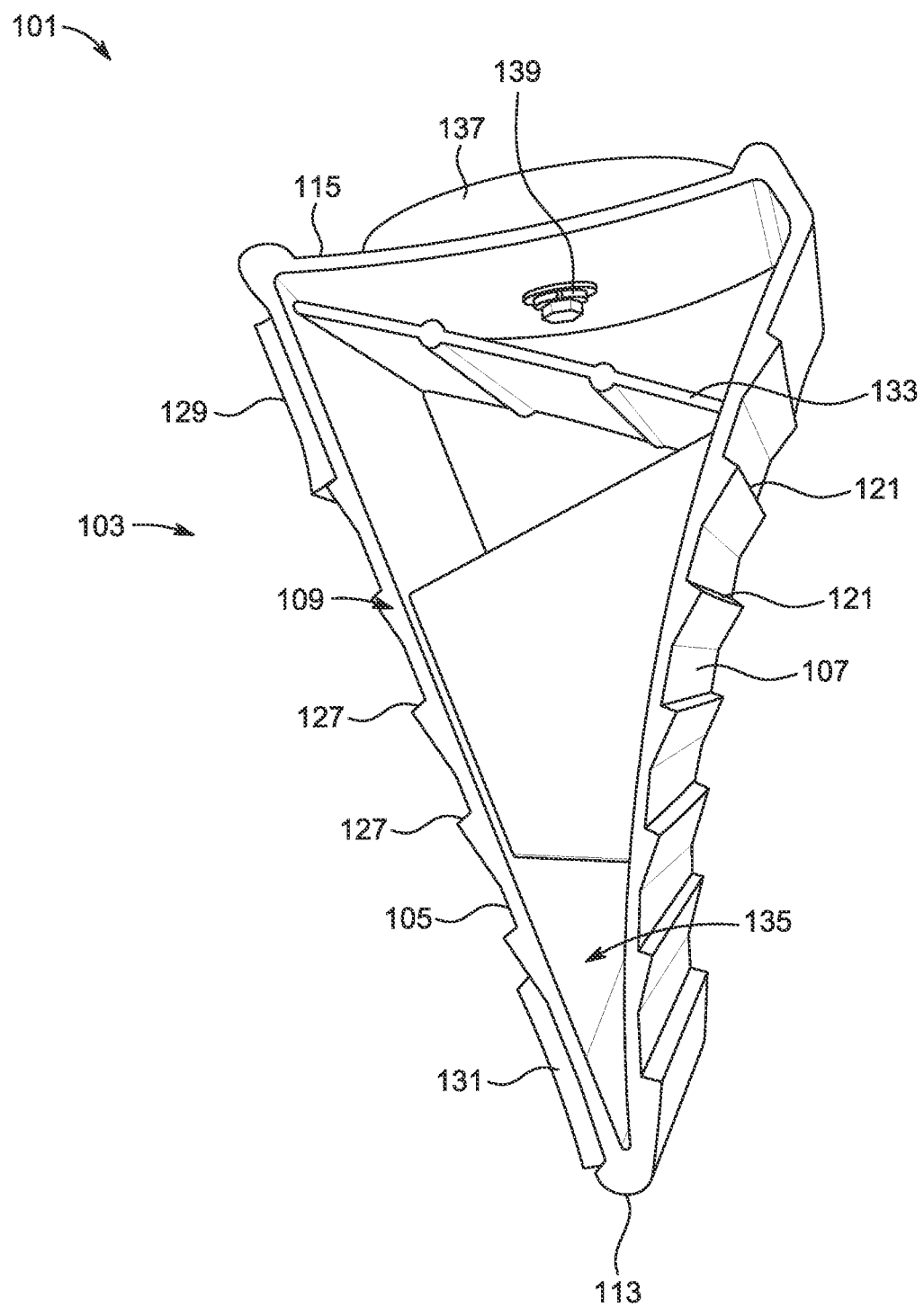
FIG. 1C is a side view of the wheel chock of FIG. 1A.
Figure 1D:
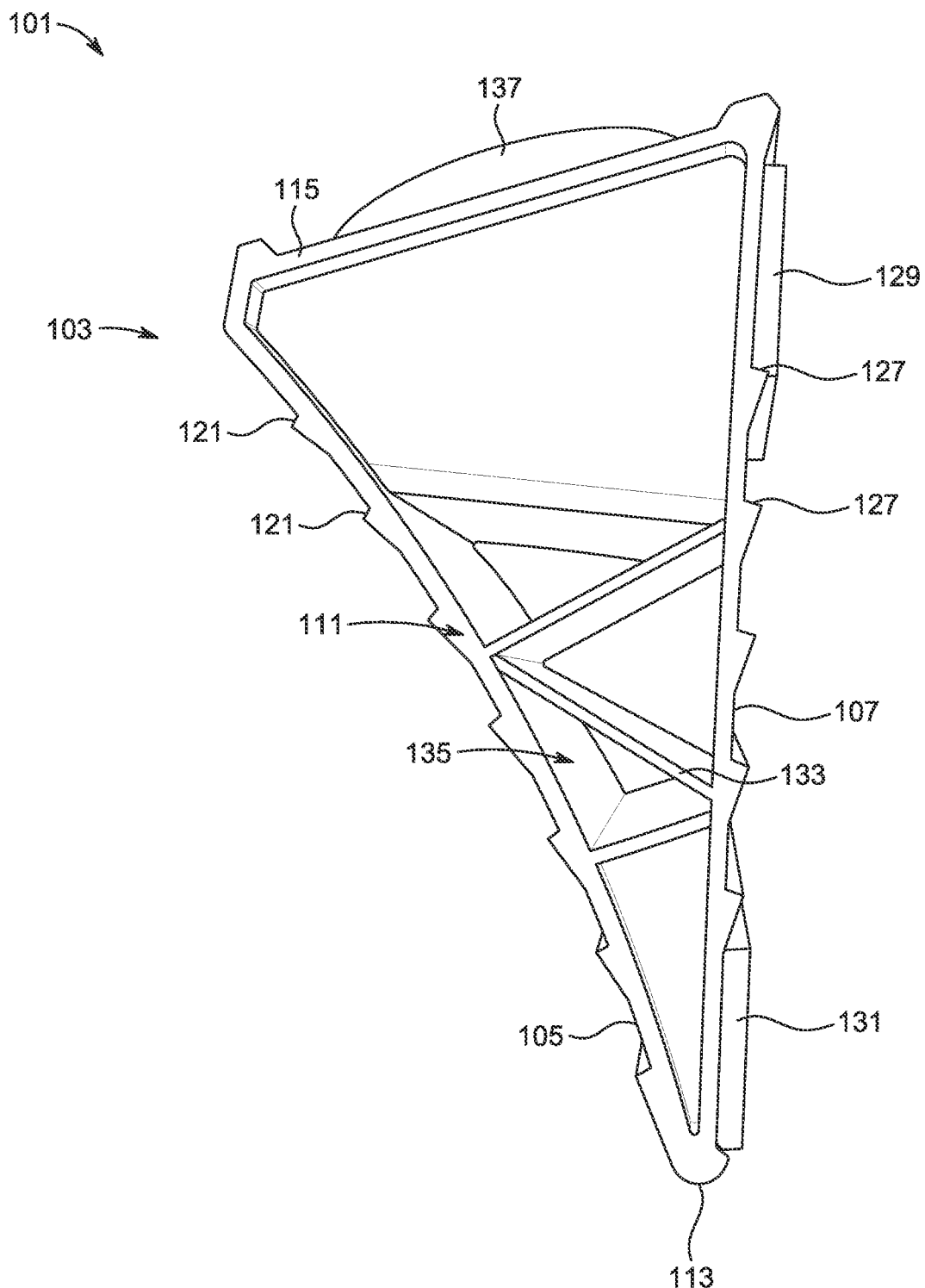
FIG. 1D is another side view of the wheel chock of FIG. 1A.
Figure 1E:
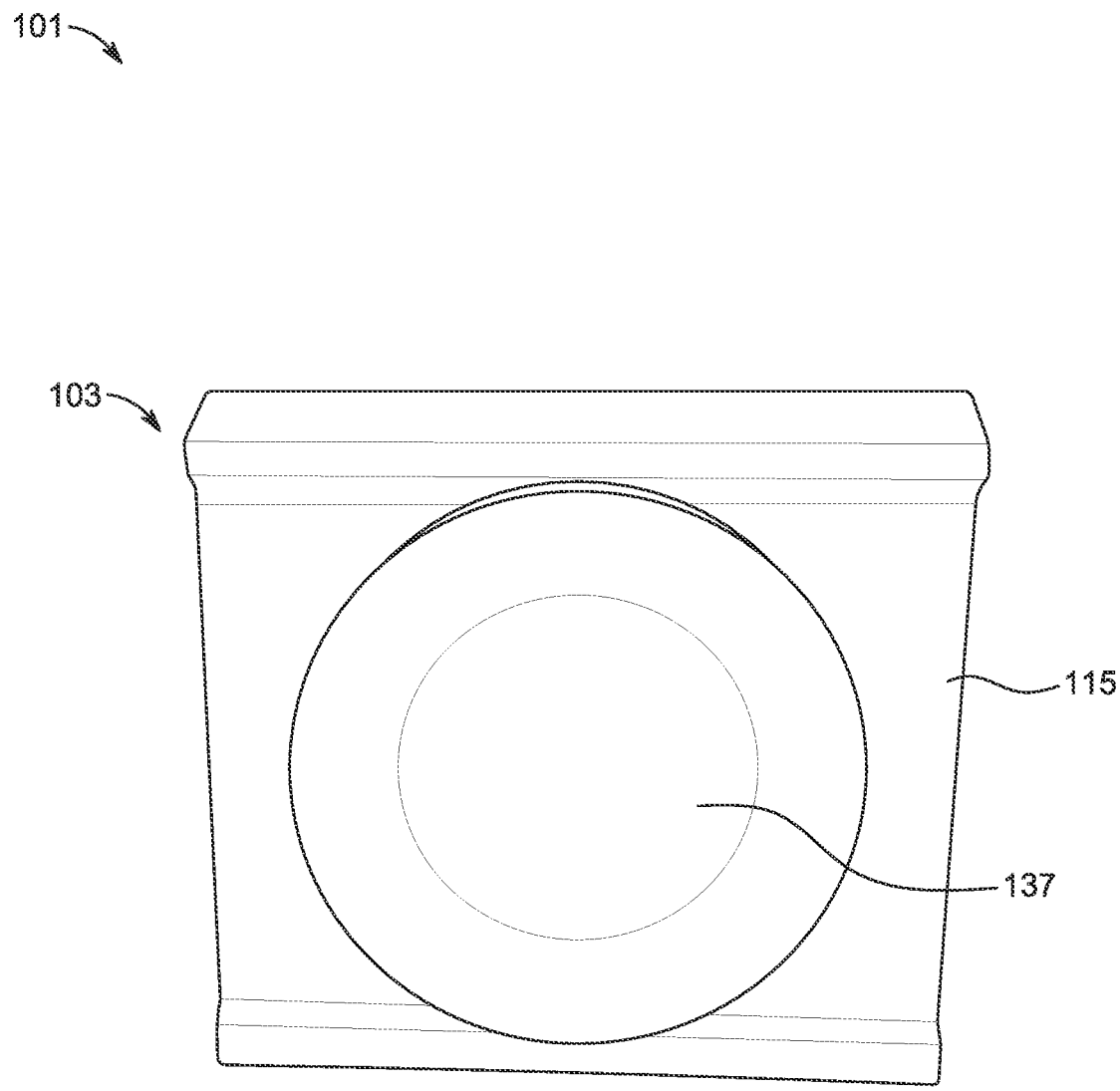
FIG. 1E is a rear view of the wheel chock of FIG. 1A.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional wheel chocks. Specifically, the present invention enables a user to quickly access, transport, and store one or more wheel chocks. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIGS. 1A through 1E depict various views of a wheel chock 101 in accordance with a preferred embodiment of the present application. It will be appreciated that the wheel chock 101 overcomes one or more of the above-listed problems commonly associated with conventional wheel chocks.

In the contemplated embodiment, the wheel chock 101 comprises a generally triangular shaped body 103 having a top portion 105, a flat bottom portion 107, opposing sides 109, 111, a front edge 113, and a rear portion 115. It will be appreciated that more or fewer of such components may be included in different embodiments of the wheel chock 101.

The top portion 105 includes a relatively elevated upper rear end 117 and a relatively lower front end 119. In addition, the top portion 105 includes a plurality of ridges 121 configured to engage with a wheel of a vehicle (not shown) when the wheel chock 101 is positioned under the wheel.

The bottom portion 107 includes a rear end 123 and a front end 125. In addition, the bottom portion 107 includes a plurality of ridges 127, a first grip member 129, and a second grip member 131. The plurality of ridges 127 are configured to engage with a ground surface (not shown) and configured to prevent the wheel chock 101 from displacing when a wheel engages with the top portion 105. The grip members 129, 131 are configured to maintain firm contact with the ground surface for the wheel chock 101.

The opposing sides 109, 111 include a plurality of support members 133 that create a plurality of cavities 135 therein.

The lower front ends 119, 125 communicate to define the front edge 113.

The rear portion 115 couples the upper rear end 117 to the rear end 123.

The wheel chock 101 further includes a magnet 137 securely coupled to the rear portion 115 via a fastening mechanism 139. In the preferred embodiment, the magnet 137 includes dimensions of approximately 88-millimeters in length and approximately 8-millimeters in height. Also, in the preferred embodiment, the magnet 137 is neodymium rubber coated with internal threads (e.g., M6). It should be appreciated that the magnet 139 has a vertical magnetic force of approximately 100-pounds, enabling the wheel chock 101 to couple to a metal portion of a vehicle. It should also be appreciated that the fastening mechanism 139 may be any fastener suitable to securely couple the magnet 137 to the rear portion 115 including, without limitation, screws, bolts, fender washers, lock washers, other suitable fasteners, or the like.

In the preferred embodiment, the wheel chock 101 includes dimensions of approximately 8-inches in length, 4.75-inches in width, and 4.25-inches in height. It should be appreciated that the wheel chock 101 may have a wide range of dimensions depending on the dimensions of a vehicle's tires.

It should be appreciated that the wheel chock 101 may be made from any suitable or desired materials, including conventional materials known and used in the art, such as, steel materials, aluminum materials, other metal alloy materials, polymeric materials, rubber materials, combinations of various materials, and the like.

It should also be appreciated that the wheel chock 101 may include different colored materials, colored patterns, images, and the like.

It should further be appreciated that one of the unique features believed characteristic of the present application is the inclusion of a magnet capable of coupling the wheel chock to a metal surface of a stationary or moving vehicle.

Figure 2:
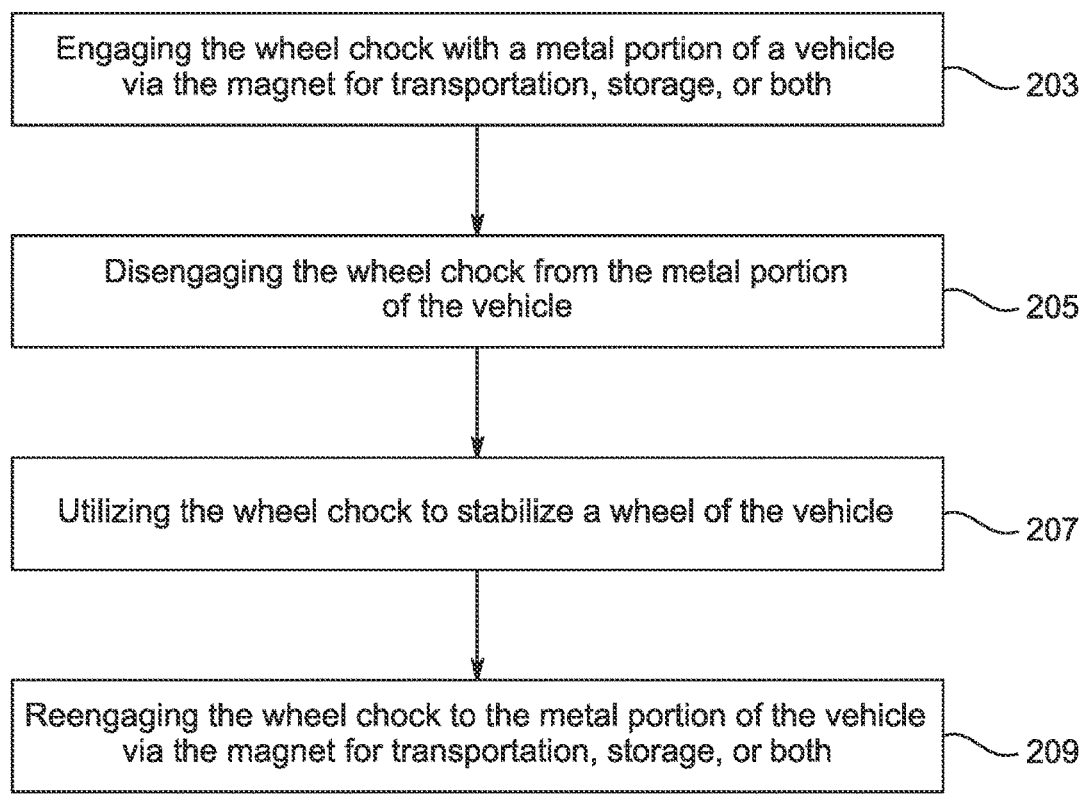
FIG. 2 is a flowchart of a method of use of the wheel chock of FIG. 1A.

In FIG. 2, a flowchart 201 depicts a simplified method of use associated with the wheel chock 101. During use, the wheel chock is engaged with a metal portion of a vehicle via the magnet for transportation, storage, or both, as shown with box 203. When the wheel chock is disengaged from the metal portion of the vehicle, the wheel chock is utilized to stabilize a wheel of the vehicle, as shown with boxes 205, 207. The wheel chock is then reengaged to the metal portion of the vehicle via the magnet for transportation, storage, or both, as shown with box 209.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A wheel chock, comprising:
    a generally triangular shaped body, the body having:
        a top portion having a top surface that extends from an elevated upper rear end to a lower front end, and a plurality of ridges extending from the top surface and configured to engage with a wheel of a vehicle;
        a flat bottom portion having a bottom surface that extends from a front end to a rear end, a plurality of ridges configured to engage with a ground surface, and one or more grip members configured to maintain firm contact with the ground surface;
        opposing sides having a plurality of support members that create a plurality of cavities therein; and
        a rear portion having a rear surface extending between the elevated upper rear end of the top portion and the rear end of the bottom portion, the rear portion does not come into contact with the wheel of the vehicle or the ground surface when in use;
        wherein the lower front end of the top portion and the front end of the bottom portion connect to define a front edge; and
    a magnet securely coupled to the rear portion via a fastening mechanism, the magnet configured to exert a vertical magnetic force of approximately 100 pounds, the magnet protruding from the rear surface of the rear portion such that the rear surface does not come into contact with a surface to which the magnet is magnetically retained;
    wherein the magnet does not come into contact with the wheel of the vehicle or the ground surface when the wheel chock is in use.

2. The wheel chock of claim 1, wherein the magnet further comprises a neodymium rubber coat with an internal thread.

3. The wheel chock of claim 1, wherein the magnet is a circular magnet having a length of approximately 88-millimeters.

4. The wheel chock of claim 3, wherein the magnet is a single magnet, the wheel chock lacking any additional magnets.

5. The wheel chock of claim 4, wherein the fastening mechanism is a bolt extending through the rear portion and into the magnet.

6. A method of transporting and storing a wheel chock for quick employment, the method comprising, in functional order:
    providing a wheel chock, the wheel chock comprising:
        a generally triangular shaped body, the body having:
            a top portion having a top surface that extends from an elevated upper rear end to a lower front end, and a plurality of ridges extending from the top surface and configured to engage with a wheel of a vehicle;
            a flat bottom portion having a bottom surface that extends from a front end to a rear end, a plurality of ridges configured to engage with a ground surface, and one or more grip members configured to maintain firm contact with the ground surface;
            opposing sides having a plurality of support members that create a plurality of cavities therein; and
            a rear portion having a rear surface extending between the elevated upper rear end of the top portion and the rear end of the bottom portion, the rear portion does not come into contact with the wheel of the vehicle or the ground surface when in use;

wherein the lower front end of the top portion and the front end of the bottom portion connect to define a front edge; and a magnet securely coupled to the rear portion via a fastening mechanism, the magnet configured to exert a vertical magnetic force of approximately 100 pounds, the magnet protruding from the rear surface of the rear portion;

engaging the wheel chock with a metal portion of the vehicle via the magnet for transportation, storage, or both, wherein the rear surface does not come into contact with the metal portion of the vehicle when the magnet is there engaged;

disengaging the wheel chock from the metal portion of the vehicle by applying at least 100 pounds of force against the magnet;

utilizing the wheel chock to stabilize the wheel of the vehicle, wherein the magnet does not come into contact with the wheel or the ground surface during stabilization; and reengaging the wheel chock with the metal portion of the vehicle.

7. The method of claim 6, wherein the magnet further comprises a neodymium rubber coat with an internal thread.

8. The method of claim 6, wherein the magnet is a circular magnet having a length of approximately 88-millimeters.

9. The method of claim 8, wherein the magnet is a single magnet, the wheel chock lacking any additional magnets.

10. The method of claim 9, wherein the fastening mechanism is a bolt extending through the rear portion and into the magnet.

* * * * *